Figure 1A:
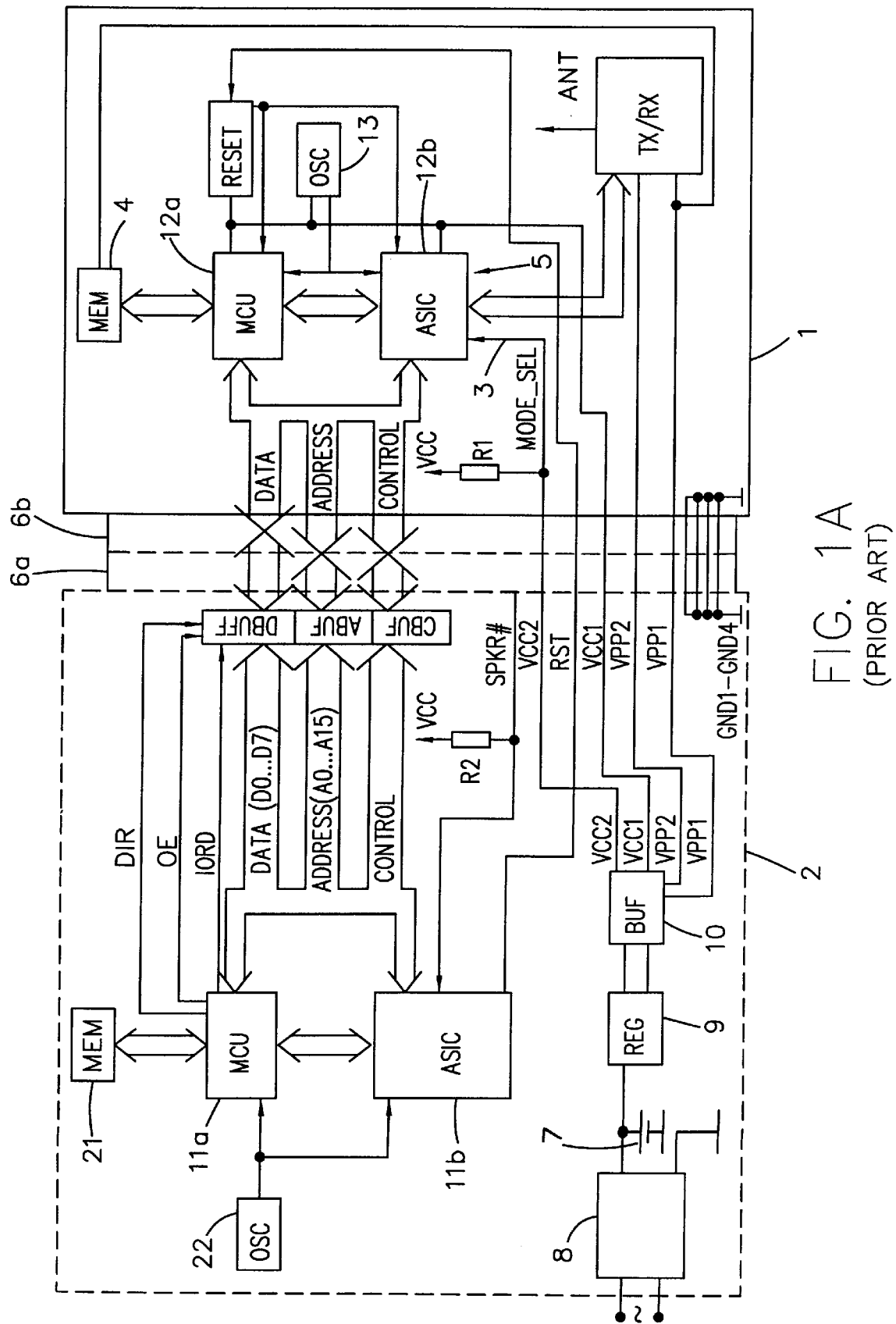

United States Patent
Köppä

[11] Patent Number: 6,088,746
[45] Date of Patent: Jul. 11, 2000

[54] MODE SELECTION LINE FOR SELECTING ONE OF A PLURALITY OF OPERATION MODES SAID SELECTION LINE CAN ALSO BE USED FOR ORIGINAL PURPOSE AFTER MODE SELECTION

[75] Inventor: Vesa Köppä, Tampere, Finland

[73] Assignee: Nokia Mobile Phones Ltd., Espoo, Finland

[21] Appl. No.: 08/991,136

[22] Filed: Dec. 16, 1997

[30] Foreign Application Priority Data

Dec. 19, 1996 [FI] Finland ..................... 965107

[51] Int. Cl.⁷ ................................................ G06F 13/14
[52] U.S. Cl. ...................... 710/63; 710/105; 348/222; 348/232
[58] Field of Search ................... 710/1, 62, 63, 710/105; 348/222, 232

[56] References Cited

U.S. PATENT DOCUMENTS

| | | | |
|---|---|---|---|
| 4,787,064 | 11/1988 | Wagner. | |
| 5,263,178 | 11/1993 | Liukkonen | 455/76 |
| 5,353,328 | 10/1994 | Jokimies | 379/58 |
| 5,392,282 | 2/1995 | Kiema | 370/77 |
| 5,490,235 | 2/1996 | Von Holten et al. | 395/2.79 |
| 5,786,851 | 7/1998 | Kondo et al. | 348/222 |
| 5,793,989 | 8/1998 | Moss et al. | 710/105 |
| 5,884,102 | 3/1999 | England et al. | 710/62 |

FOREIGN PATENT DOCUMENTS 94680 10/1995 Finland.

*Primary Examiner*—Thomas C. Lee
*Assistant Examiner*—Abdelmoniem Elamin
*Attorney, Agent, or Firm*—Perman & Green, LLP

[57] ABSTRACT

An expansion card (1) of an electronic device (2) comprises in accordance with the invention at least one expansion-card connector (6b) for connecting the expansion card (1) to an expansion-card connector (6a) of an electronic device. The expansion card (1) has at least one standard normal operation mode and at least one special operation mode which differs at least partially from said standard. The operation mode is arranged to be selected by at least one mode-selection line (3) which is connected to a contact pin of the expansion-card connector (6b), which contact pin has a respective contact pin (SPKR#, IREQ#, IOIS16#, WAIT#, STSCHG#) for the expansion-card connector (6a) of the electronic device (2), said respective contact pin being defined in said standard as an input line of the electronic device, which can be used, if necessary, also for the original purpose.

13 Claims, 6 Drawing Sheets

MODE SELECTION LINE FOR SELECTING ONE OF A PLURALITY OF OPERATION MODES SAID SELECTION LINE CAN ALSO BE USED FOR ORIGINAL PURPOSE AFTER MODE SELECTION

The present invention relates to an expansion card according to the preamble of claim 1, expansion-card interface according to the preamble of claim 4, and electronic device according to the preamble of claim 7.

A PCMCIA interface (Personal Computer Memory Card International Association) is one known interface which is used in connection with electronic devices to connect expansion cards, such as memory cards (for example flash memory cards), modems and various kinds of input/output cards (I/O), to an electronic device. Such electronic devices and PCMCIA cards include connectors according to PCMCIA standard, for example such that the connector of electronic device is a so-called male connector (connector with contact pins), and the connector of the interface card is a so-called female connector (connector with jointing sleeves). Thus, an electrical contact is formed between each contact pin and the corresponding jointing sleeve when the interface card is connected to the connector of the electronic device. The PCMCIA standard defines the normal function of each contact pin and each jointing sleeve respectively. Thus, for example in an application where PCMCIA interface is realized in a computer, each data line of the data bus of the computer is connected to one of the contact pins of the PCMCIA interface. Additionally, at least a part of the address and control lines are connected to the connector.

The PCMCIA cards have a size of a credit card (85.6 mm×54 mm), but the thickness of the cards can be 3.3 mm (type I), 5.0 mm (type II) or 10.5 mm (type III). The PCMCIA cards are connected electrically to the electronic device as 8/16 bit I/O interface or memory. According to the PCMCIA standard, the PCMCIA card will have a memory area which can be read by the electronic device. This memory area includes information for the identification of the card. This information is called card information structure (CIS).

Figure 1B:
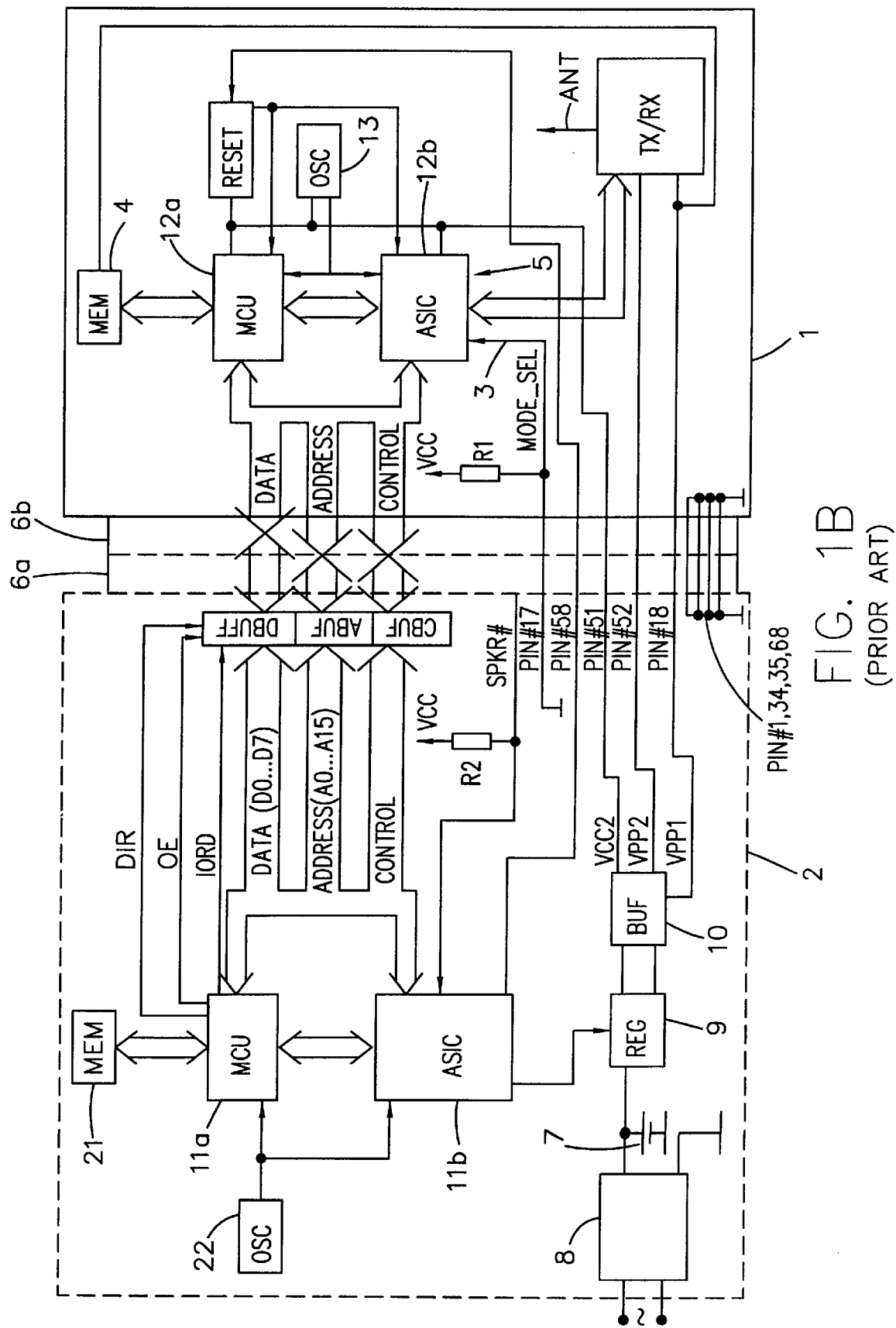

In particular, in connection with portable data processors (PC), mobile station embodiments have been designed, in which at least a transmitter/receiver unit TX/RX of the mobile station is provided in the PCMCIA standard card form. FIGS. 1a and 1b show a reduced block diagram of the transmitter/receiver unit of one mobile station, which is illustrated in block 1 positioned in a PCMCIA card. The unit controlling the operation of the card is advantageously a microcontroller 12a (MCU) having e.g. a processor, memory (RAM, ROM), and input/output lines for connecting the microprocessor to other electronics of the card. In addition, external memory 4 can be connected to the microcontroller 12a.

A transmitter TX comprises e.g. a modulator for modulating the signal to be transmitted, filters in particular for attenuating spurious emissions, a mixer in which the modulated signal is mixed to a local oscillator frequency for creating a radio frequency signal, and a power amplifier for amplifying the signal to be sent. The amplified signal is directed to an antenna ANT, which is connected to the card e.g. by means of a cable. A receiver RX comprises e.g. filters for filtering the received signals, a mixer for converting the radio frequency signal to be received to an intermediate frequency or, in a direct-change type receiver, to a baseband, and a detector for demodulating the received signal. Furthermore, the card has interface circuits, such as a control circuit 12b (ASIC), for transferring of signals between the PC and the transmitter/receiver. The transmitter/receiver unit has no power supply of its own, but the power supply is provided from the PC via the PCMCIA connection.

The watch-dog circuit RESET of the expansion card keeps the microcontroller 12a of the card at the initial phase, if the operating voltage of the card is, for some reason, insufficient. Thus, malfunctions of the microcontroller are eliminated e.g. during the coupling of the voltages.

Often these kinds of expansion cards, such as PCMCIA cards have, in addition to the standard operation mode one or several operation modes which differs, at least partially, from the definitions of the standard. The standard operation mode is in this description designated as a special operation mode and those operation modes that differ from the standard are designated as a special operation mode. These special operation modes can be used e.g. in connection with the manufacture of the card when testing the operation and when clarifying and repairing operational malfunctions that possibly take place during the operation. A further possible use of the special operation mode is a situation in which the electronic device provided with a standard card interface cannot be used. The expansion card is implemented in a manner that at least a part of the properties of the card operate by positioning it to a special operation mode, which extends the possibilities and objects to use the expansion card. However, the problem is how to set the operation mode of the card to the desired mode.

The card interfaces of electronic devices are implemented according to the definitions of the standard used at the time. However, no other operation modes than the PCMCIA operation mode are defined in the PCMCIA standard, wherein neither the selection of mode is implemented in the standard. The PCMCIA interface comprises no supplementary contact pins or contact pins regarded for general use which could be used for implementation of such mode selection.

FIGS. 1a, 1b show one prior art solution for selecting the operation mode of the interface card. The interface card 1 comprises a mode selection means 5, which is advantageously implemented in a control logic circuit (SMART ASIC) or microcontroller 12a. To the mode selection means a mode-selection line 3 (MODE_SEL) is directed, this line 3 being connected to the contact pin of the expansion card, which pin is, in this connection, a second supply pin $V_{cc2}$ of operating voltage. Thus, operating voltage is supplied to the expansion card only from a first supply pin $V_{cc1}$ of operating voltage. The mode selection means examines the mode of the mode-selection line when the expansion card is turned on. The mode-selection line is usually directed to the control logic circuit of the expansion card, at some interface line (I/O, Input-Output) or directly to the interface line for the microcontroller 12a of the expansion card, wherein the initial measures for the operation mode of the card are carried out in the application software of the microcontroller 12a of the expansion card on the basis of the mode of the line. In case the line is at the first mode (e.g. logic 1 state), as shown in FIG. 1a, where the expansion card is connected to a standard expansion-card interface, the expansion card is directed to operate at the normal operation mode. In a corresponding manner, in case the line is at the second mode (e.g. logic 0 state), as shown in FIG. 1b, where the expansion card is connected to a non-standard expansion-card interface, e.g. for testing, the expansion card is moved to operate at special operation mode. A resistance R1 operates mainly as a means that stabilizes the mode of the mode-selection line for preventing erroneous interpretations. A factor restricting the operation of the method in accordance with FIGS. 1a and 1b is e.g. the fact that operating voltage can be supplied to the expansion card only via one supply line of the operating voltage, which restricts the limit for the maximum allowable power consumption of the interface card to 0.5 A in practical embodiments. This restriction arises mainly from the fact that the maximum allowable value for the current that is led via the contact pins is said 0.5 A. Many embodiments, such as the above-described mobile-station embodiment, the power consumption can be greater than 0.5 A, wherein this mode selection arrangement is not applicable.

A prior patent application FI-935272 of the applicant discloses an expanded PCMCIA interface wherein one operating voltage pin and at the most three ground-potential pins are connected to a second voltage in relation to a standard voltage. One of these pins would thus be selected for mode selection. Furthermore, a supply pin of operating voltage, or a supply pin of ground potential, intended for use in mode selection can no longer be used for the original purpose of power supply. As a result of this, the power to be supplied to the expansion card is reduced, because there are fewer connection pins available for supplying the same power. The solution described in said publication is applicable mainly for expansion cards with a reasonable power consumption. Moreover, in different electronic devices, there is often already the second power supply line or a ground potential line defined in a different way, wherein such an expansion card ends up in an incorrect operation mode by accident when the expansion card is connected with the electronic device. In a connection according to the present application, however, there is no such risk, because the mode selection line used is always a contact pin which is an input line to the electronic device. Such lines have usually a relatively high input impendance, and the expansion card is always set into the operation mode intended.

An object of the present invention is to decrease the above-described drawbacks and to provide an expansion-card interface having at least two operation modes, one of which is selected for each turn on, and an expansion-card interface whereby the operation mode of the expansion card can be selected and still a maximal current supply is attained for the expansion card. The invention is based on the idea that the mode-selection line used is a contact pin which, with regard to the electronic device that controls the expansion card, is the input line and which can be used also for the original purpose, if necessary. When selecting the operation mode, it is also possible to use more than one mode-selection line, in particular for cards having more than one special operation mode. The expansion card in accordance with the invention is characterized by what is described in the characterizing portion of the accompanying claim 1. The expansion-card interface in accordance with the invention is characterized by what is described in the characterizing portion of the accompanying claim 4. Additionally, the electronic device in accordance with the invention in accordance with the invention is characterized by what is described in the characterizing portion of the accompanying claim 7.

The present invention provides significant advantages over prior art solutions. Selection of the operation mode in accordance with the invention does not limit the current intensity which can be supplied to the expansion card, because operating voltage lines and ground-potential lines are used as mode-selection lines. Further, the expansion card connected to an electronic device provided with a standard interface operates according to said standard. Yet another advantage is obtained by the fact that the mode-selection line, in particular in expansion cards according to the PCMCIA standard, can be selected among several connection lines applicable for the purpose, because one of these lines is, depending on the purpose of use, usually not in use. After mode selection, the mode selection line can also be used for the original purpose, if necessary. When moving to a special operation mode, it is possible to define, if necessary, all the contact pins to function in a way different from the operation mode according to the standard, whereby the connection can be made simpler. Thus the electronic device to be used as a so-called hosta device can be simpler.

Figure 2A:
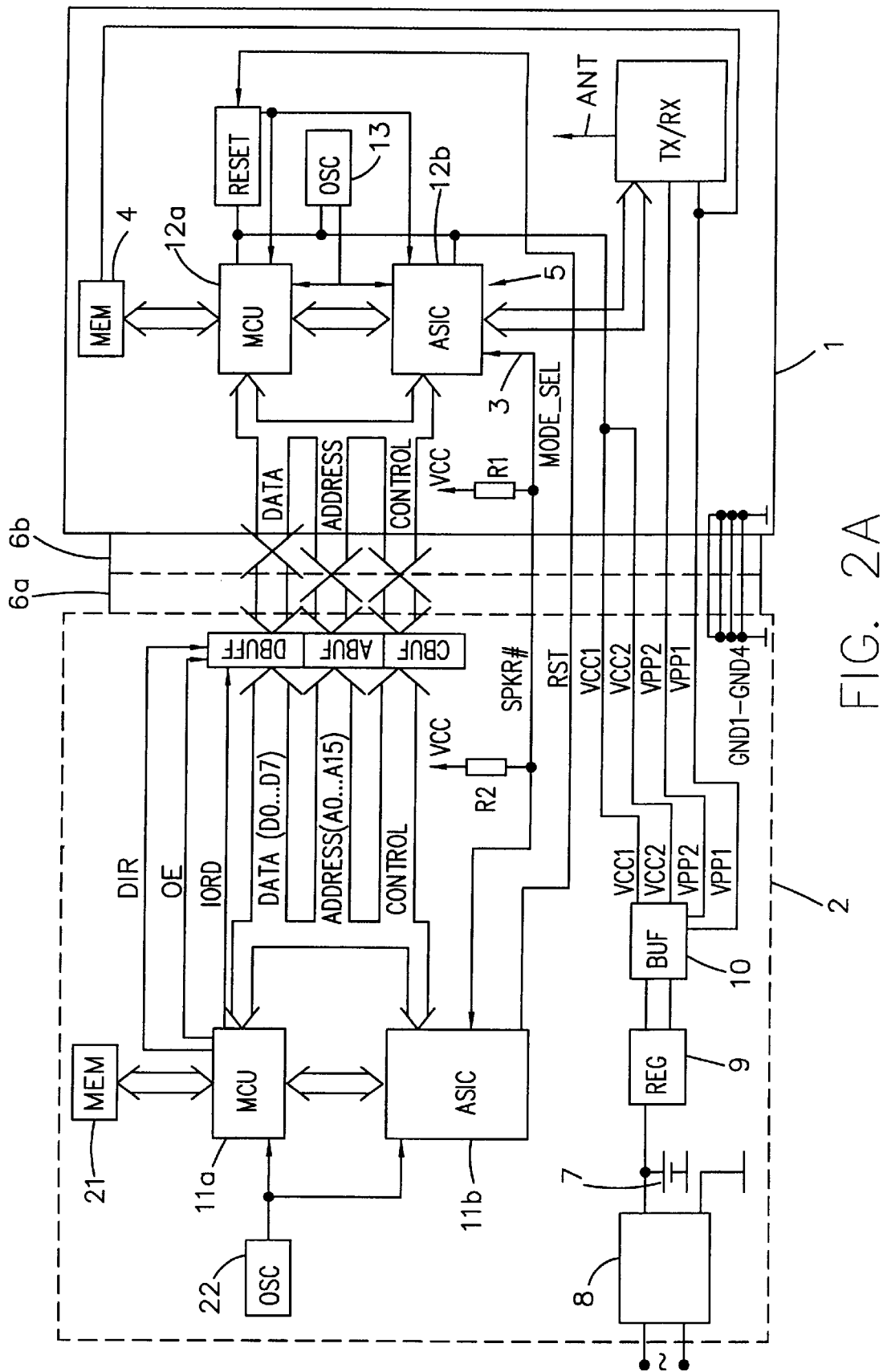
Figure 2B:
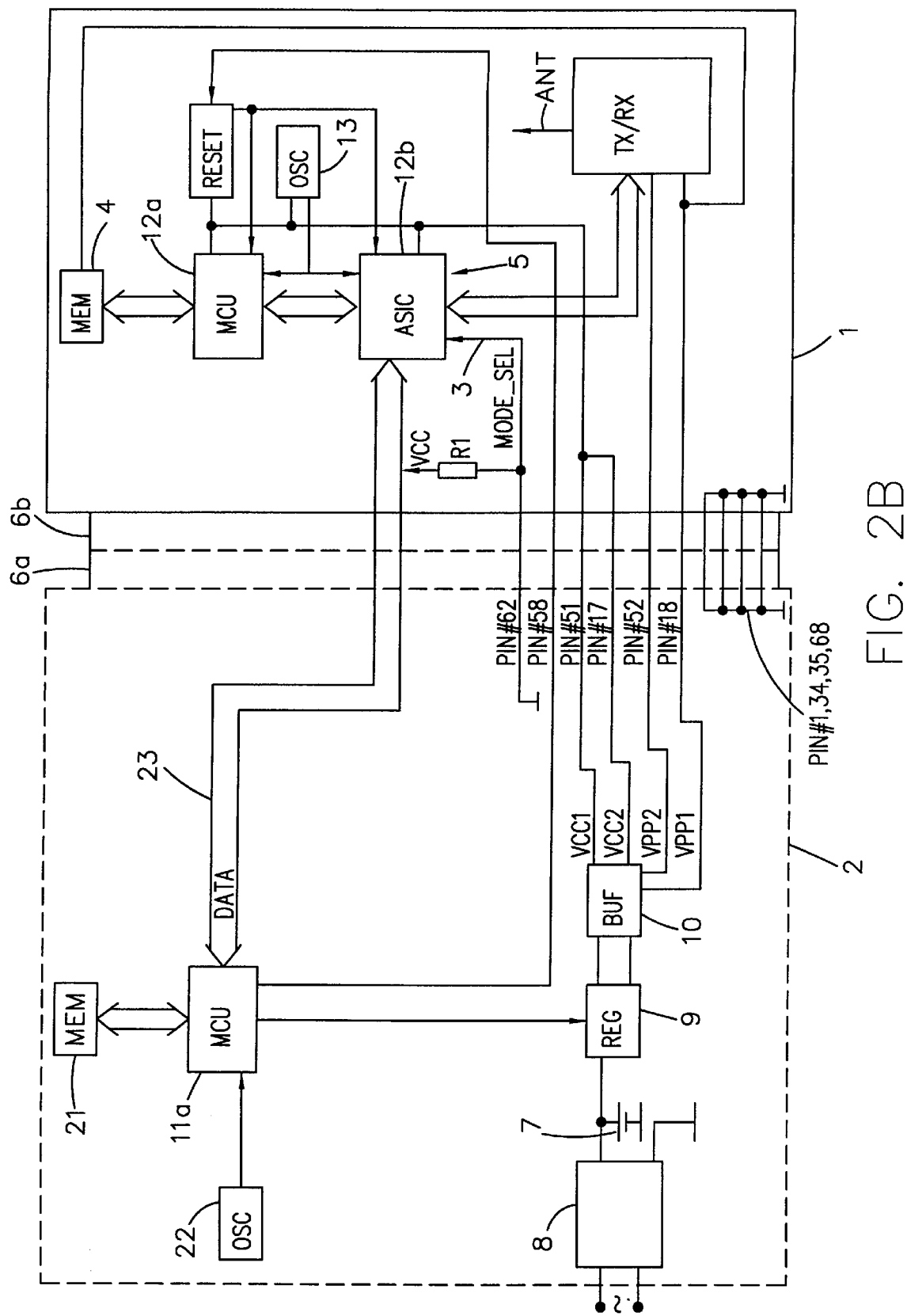
Figure 2C:
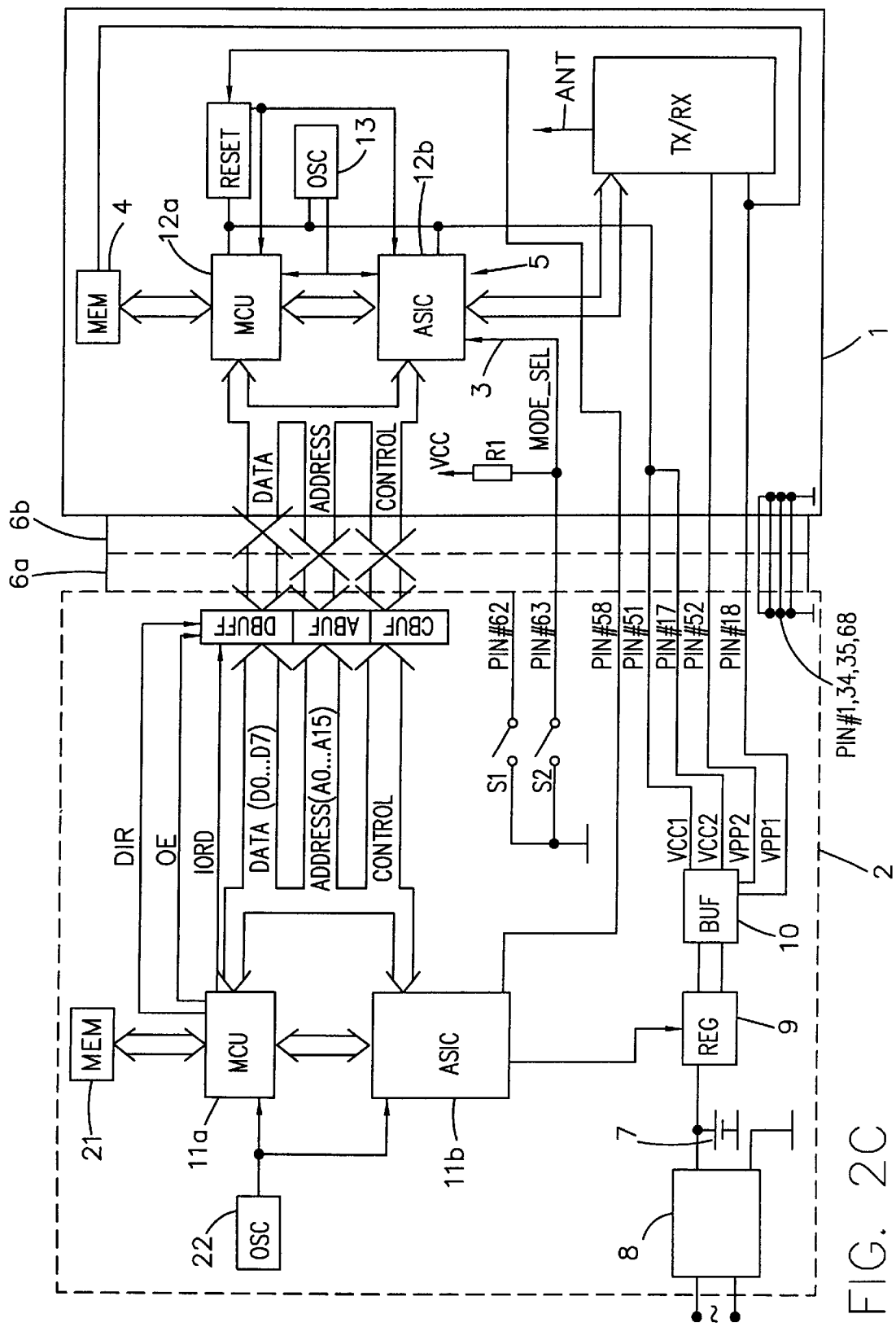
Figure 3:
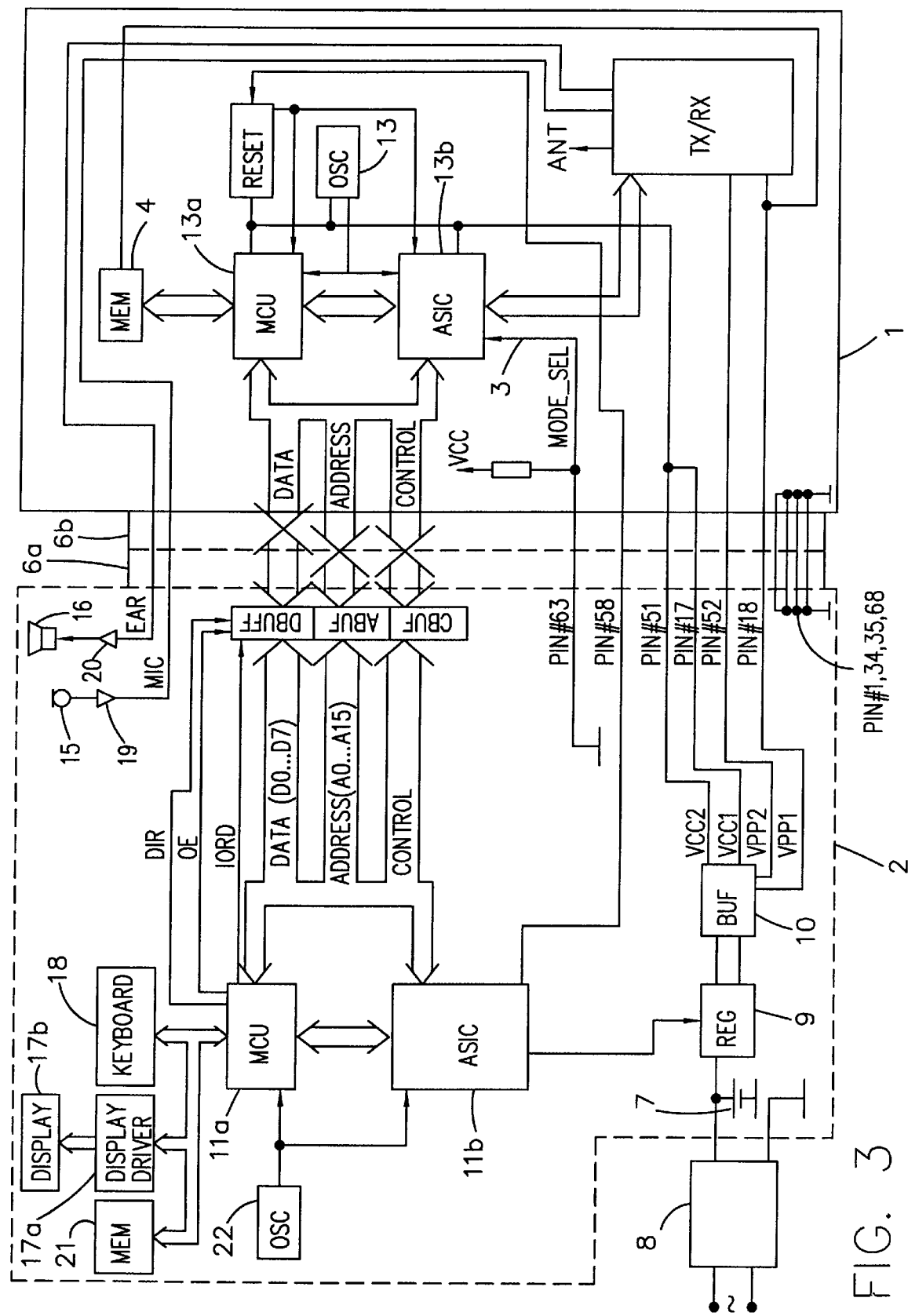

In the following, the invention will be described in more details, with reference made to the accompanying drawings, wherein FIG. 1a shows a reduced block diagram of one prior art mode selection connection for an expansion card connected to a standard expansion-card interface, FIG. 1b shows a reduced block diagram of one prior art mode selection connection for an expansion card connected to a non-standard expansion-card interface, FIG. 2a shows, in accordance with one advantageous embodiment of the invention, a reduced block diagram of a mode selection connection for an expansion card connected to a standard expansion-card interface, FIG. 2b shows, in accordance with one advantageous embodiment of the invention, a reduced block diagram of a mode selection connection for an expansion card connected to a non-standard expansion-card interface, FIG. 2c shows, in accordance with one advantageous embodiment of the invention, a reduced block diagram of a mode-selection line wherein the mode-selection line can be selected by switches, and FIG. 3 shows, in accordance with an advantageous embodiment of the invention, a reduced block diagram of an expansion-card interface as placed to the handset of the telephone.

The accompanying FIGS. 2a to 2c and 3 show only those blocks that are necessary for understanding the invention. In the embodiment according to FIG. 2a, the expansion card 1 is connected to an electronic device 2, such as a portable computer comprising an expansion-card interface in accordance with the PCMCIA standard. The expansion card 1 can be any expansion card. The present description provides as an example an expansion card comprising an transmitter/receiver unit TX/RX of the mobile station. FIGS. 2a and 2b show in view of a connector 6 only a few connection lines, such as supply lines $V_{cc1}$, $V_{cc2}$ for the operating voltage, supply lines $V_{pp1}$, $V_{pp2}$ for the programming voltage, ground lines GND1 to GND4, starting line RST and the control line SPKR# for a loudspeaker. The address bus, data bus and other lines of a control bus are each shown as a separate arrow in the electronic device 2 and on the expansion card 1. The control line SPKR# for the loudspeaker is, in view of the electronic device 2 that controls the expansion-card interface, an input line, i.e., the electronic device 2 does not control the line, but a pull-up resistance R2 is connected thereto. The examples of FIGS. 2a and 3a show a mode-selection line 3 connected in the connector 6 to the control line SPKR# of the loudspeaker. Other corresponding input lines in the PCMCIA standard are an interruption-request line IREQ, width-selection line IOIS16# of the I/O port, operation line WAIT# for wait states, and a state change line STSCHG# of the card, which lines can also be used as the mode-selection line 3 in accordance with the inventive idea of the present invention with the following preconditions.

The control line SPKR# of the loudspeaker can be used when the expansion card 1 does not transmit audio signals to the electronic device 2. The interruption-request line IREQ# can be used in case the expansion card 1 does not form interruption requests for the electronic device 2. The width-selection line IOIS16# of the I/O port is applicable when the I/O port of the expansion card has a width of 8 bits. The operation line WAIT# for the wait states can be used in case no wait states are needed in the use of the expansion card 1, i.e., the expansion card 1 can transmit data via the data bus sufficiently fast to the electronic device 2. The state-change line STSCHG# of the card can be used e.g. with memory cards to indicate changes that have taken place in the memory state, wherein said state-change line cannot be used as the mode-selection line 3 on an expansion card of this kind. Further, Table 1 provides as a summary of the PCMCIA standard names, pin numbers and objects of use for said lines, as well as the situation in which the pin can be used as the mode-selection line 3. Within the scope of the invention it is possible to use also other suitable lines as the above-mentioned ones for the input line of the electronic device 2.

The connector 6 refers in this description both to a connector 6a of the electronic device 2 and a connector 6b of the expansion card 1. The pins of the connector 6 are designated according to the PCMCIA standard, but the invention is applicable also in connection with other connection standards, wherein also the structure of the connectors and the order of the pins can be different.

TABLE 1

| Name | Pin-number | Object of use | Use for the mode selection |
| --- | --- | --- | --- |
| SPKR#/BVD2 | 62 | Loudspeaker signal | Loudspeaker is not needed |
| IREQ# | 16 | Request for interruption | No active interruptions |
| IOIS16#/WP | 33 | I/O port with 16 bits | I/O port with 8 bits |
| WAIT# | 59 | Lengthening of the bus period | Wait periods not needed |
| STSCHG#/BVD1 | 63 | Change of card status | Status signals of the memory not used |

The PCMCIA standard defines that the PCMCIA expansion card operates at the starting state in a corresponding manner as a memory card regardless of the type of the expansion card 1. The electronic device 2 reads the information-structure database CIS as soon as the expansion card is mounted on its place. According to this information, the electronic device 2 knows which operations the expansion card 1 includes and how it is used. At this phase, the control line SPKR# for the loudspeaker of the extension-card interface of the electronic device 2 is used as the detector (BVD2) for the status of the battery, wherein the expansion card 1 can indicate to the electronic device 2 whether the battery of the expansion card 1 operates. However, a battery is not used in all the expansion cards, wherein a pull-up resistance R1 is advantageously connected to the line on the expansion card 1. Further, the electronic device 2 should have a pull-up resistance R2 in the corresponding line.

The CIS database is advantageously stored to a non-volatile random access memory (NVRAM) 4, which in this example is carried out by FLASH memory circuits. The CIS database is shown as memory at a given location. For example the PCMCIA standard includes a definition that the CIS database begins at an address 0 of the attribute memory. The reading of CIS database is carried out so that a processor 11 of the electronic device sets the initial address of the CIS database to the address lines A0 to A15 of the card interface; the control line DIR of the transfer direction to a state where the data transfer direction of the data lines D0 to D7 is from the card to the electronic device; the data-buffers-allowed line OE to a state where data buffers DBUFF are activated; and the data-reading line IORD to data-reading state. Thus, the first byte of the CIS database can be read in the data bus of the interface by the electronic device. The next byte is read according to a corresponding principle, by setting the address of the next byte to the address line. Said states of the control lines DIR, OE, IORD depend on the respective embodiment used, and they can be active low, which is known as such, i.e., a logic 0 state (voltage value about 0V in connection with common CMOS and TTL circuits) activates the function, or active high, i.e., a logic 1 state (about a voltage corresponding to the operating voltage in connection with common CMOS and TTL circuits) activates the function.

After reading the data of the card information structure CIS, the electronic device 2 sets the expansion card 1 to the I/O mode if the card used is an I/O type expansion card. Consequently, the control line SPKR# of the loudspeaker can be used for directing audio signals from the expansion card 1 to the electronic device 2.

Correspondingly, on the expansion card 1 the mode selection means 5 reads the mode of the mode-selection line 3. In FIG. 2a the expansion card is connected to an expansion-card connector 6 in an electronic device 2 comprising a standard expansion-card interface, wherein the pull-up resistance R1 coupled to the mode-selection line 3 and the pull-down resistance R2 of the electronic device set the line to a voltage value that substantially corresponds to the operating voltage $V_{cc}$, i.e., to the logic 1 state. Based on this, the mode selection means 5 sets the expansion card 1 to the special operation mode, which is a standard operation mode in this embodiment.

In FIG. 2b the expansion card 1 is connected to the expansion-card connector 6 in the electronic device 2 comprising an expansion-card interface that differs at least partially from the standard, in which expansion-card interface the pin corresponding to the control line SPKR# is connected to a ground potential. Thus, in spite of the pull-up resistance R1 coupled to the mode-selection line 3 the line is substantially at a voltage value corresponding to the ground potential, i.e., the logic 0 mode. Based on this the mode selection means sets the expansion card to the special operation mode which is a non-standard operation mode in this embodiment. When moving to a special operation mode, it is possible, if necessary, to define contact pins to function in a way different from that in the standard operation mode, whereby the connection can be made simpler. In some cases, even the re-setting of all the contact pins may come into question. Thus, the electronic device 2 used as the host device can be simpler.

Thus, the mode selection means 5 of the expansion card 1 reads the mode of the mode-selection line 3 after the card has been positioned to its place when the voltages are switched on, but also when the card is for some reason started again, i.e., by setting the logic 1 mode for a moment to a start line RST.

The mode selection is implemented advantageously only in connection with the start, and the mode selection means 5 preferably maintains the selected operation mode in use up to the next start, so that the mode-selection line 3 can be used also for other purposes after the mode selection by making respective changes to the switch and possibly also to the application software.

In the interface in accordance with the example of this embodiment, the first and second supply lines $V_{cc1}$, $V_{cc2}$ for the voltage are provided by means of two contact pins e.g. for effecting higher current supply capacity to the expansion card 1. The power supply used is, in particular with portable electronic devices, a battery 7 which is charged by a charge device 8 if necessary. The electronic devices can further comprise a voltage compensation circuit 9, such as a regulator and buffer means 10 for providing voltages required on the electronic device 2. In view of the blocks of the electronic device, no supply lines for the operating voltage are illustrated, but this is technology known by an expert in the field as such. The control unit 11 of the electronic device comprises advantageously a microcontroller 11a, as shown in the circuit diagram of the electronic device in FIG. 2b. The control unit may comprise also a control logic circuit 11b, such as an ASIC circuit, as shown in FIG. 2a. The microcontroller 11a, and also the control logic circuit 11b, if necessary, attend e.g. to the operation of the expansion card interface and the transmission of signals to the expansion card 1 and the reading of signals provided by the expansion card. Timing signals for the control unit 11 are provided by a first oscillator 22, e.g. by a crystal oscillator. Memory 21, such as read only memory (ROM) or random access memory (RAM) is advantageously connected to the control unit of the electronic device.

In the electronic device 2 shown in FIG. 2b, data is transferred between the expansion card 1 and the electronic device 1 in serial form via a simple data line 23. The electronic device 2 and the expansion card 1, preferably the control unit 11, 12, are provided with means (not shown) for implementing data transmission in serial form, known as such. Data transmission in serial form has the advantage that fewer data transmission lines (data lines) will be required (usually one or two) than in data transmission in parallel form, but the transmission rate is lower, correspondingly.

In case it is preferred that the expansion card 1 is set to a special operation mode, the mode-selection line 3 has to be set to a mode corresponding thereto, said mode being the logic 0 state in the present embodiment, but in some embodiments this mode can be also e.g. the logic 1 state. The electronic device 2 can be e.g. a test apparatus having control and measuring electronics for testing the properties of the expansion card 1 or for locating defects. A pin corresponding to the mode-selection line of the connector 6 is thus connected to a different state than in a standard connector. Mode selection can also be implemented in a manner that by switches S1, S2 (FIG. 2c) the connector line which operates as a mode-selection line in the interface card 1 to be connected at a time is set to a state corresponding to the special operation mode. The advantage of this arrangement is e.g. the fact that to the same connector 6 expansion cards 1 of various types can be connected e.g. for testing. As presented above in Table 1, the contact pin used as the mode-selection line 3 can vary according to the type of the expansion card 1.

The mode selection means 5 is advantageously implemented in control logic 12 of the expansion card 1, said control logic comprising with the most common PCMCIA cards a so-called SMART ASIC circuit 12b. An alternative embodiment is to use a microcontroller 12a, the mode-selection line 3 being directed to its I/O pin, wherein the reading of the mode-selection line 3 and the mode selection are carried out in the application software of the microcontroller 12a according to the state of said line. This technique is known to an expert in the field, wherein it is not necessary to describe it in more detail in this context.

Switches S1, S2 can be mechanical switches, or also prior art semiconductor switches can be used, wherein the control of the switches can be implemented e.g. from the electronic device 2, such as a test device. In the test device, selection means for various kinds of expansion cards 1 can be arranged for setting the switch S1, S2 corresponding to the mode-selection line 3 and for implementing test measures according to the card type used.

Timing signals of the control logic of the expansion card are provided by a second oscillator 13, e.g. a crystal oscillator.

FIG. 3 illustrates a reduced block diagram of an expansion-card interface in accordance with an advantageous embodiment of the invention, wherein the electronic device 2 is a handset 14 of a telephone, the expansion-card interface of said handset being at least partially different from the PCMCIA standard. The telephone can be e.g. a mobile station, such as a GSM mobile station. The handset 14 advantageously includes a microphone 15, earphone 16, display driver 17a, display 17b and keypad 18. The expansion card 1 can be connected to the expansion-card connector 6a, e.g. by pushing it through an opening (not shown) provided in the handset 14. The microphone 15 is coupled to a microphone contact pin MIC of the expansion-card connector 6a through a microphone amplifier 19, and the earphone 16 is coupled to the earphone contact pin EAR of the expansion-card connector 6a through an earphone amplifier 20. In the expansion card 1, the microphone and earphone lines are directed to the transmitter/receiver unit TX/RX. The display driver 17a and the keypad 18 are connected to the control unit 11, wherein the application software in the microprocessor 11a of the control unit attends to that the controls from the keypad are transferred to the expansion card 1 and, in a corresponding manner, that the display messages from the expansion card 1 are transferred via the display driver 17a to the display 17b. The transfer of signals can be e.g. parallel, as in the embodiment shown in FIG. 3, or also serial form data transfer can be used between the electronic device 2 and the expansion card 1.

To the transmitter/receiver unit TX/RX the operating voltage is taken from the supply pins $V_{pp1}$, $V_{pp2}$ of the programming voltage, because the power consumption of the transmitter/receiver unit TX/RX can rise high enough for the maximal allowable current intensity of the supply pins $V_{pp1}$, $V_{pp2}$ of the programming voltage to be exceeded, if the operating voltage of the transmitter/receiver unit TX/RX were taken from the supply pins $V_{pp1}$, $V_{pp2}$ of the programming voltage.

An interface card having more than one special operation mode has also more than one mode-selection lines 3. Thus, the logic modes of the mode-selection lines are set to modes corresponding to the desired operation mode. Table 2 illustrates one example wherein the expansion card has eight operation modes: one normal operation mode and seven special operation modes. Thus, for selecting the eight possible operation modes, at least three mode-selection lines ($2^3=8$) are required, each of which can be set to two logic states (0/1). The mode-selection lines used are e.g. the control line SPKR# of the loudspeaker, interruption-request line IREQ# and width-selection line IOIS16# for the I/O port. Prefers to a normal operation mode and X1 to X7 refer to special operation modes. The normal operation mode P is selected by setting all the mode-selection lines SPKR#, IREQ#, IOIS16# to the logic 1 state. The first special operation mode X1 is selected by setting the first mode-selection line, i.e., in this situation the control line SPKR# of the loudspeaker, to the logic 0 state while the other mode-selection lines IREQ#, IOIS16# are in the logic 1 state. In a corresponding manner, a second special operation mode X2 is selected by setting a first mode-selection line SPKR# and a third mode-selection line, which in this example is the width-selection line IOIS16# of the I/O port, to a logic 1 state and the interruption-request line IREQ# used as a second mode-selection line to the logic 0 state. The logic states (0/1) of the mode-selection lines SPKR#, IREQ#, IOIS16# for selecting also other special operation modes X3 to X7 are illustrated in Table 2.

TABLE 2

| Mode-selection | Operation mode | | | | | | | |
|---|---|---|---|---|---|---|---|---|
| line | P | X1 | X2 | X3 | X4 | X5 | X6 | X7 |
| SPKR# | 1 | 0 | 1 | 0 | 1 | 0 | 1 | 0 |
| IREQ# | 1 | 1 | 0 | 0 | 1 | 1 | 0 | 0 |
| IOIS16# | 1 | 1 | 1 | 1 | 0 | 0 | 0 | 0 |

It should further be mentioned that more than one mode-selection lines 3 can be used also in situations in which the number of the operation modes to select between is only two. Thus, e.g. the normal operation mode is selected when all the mode-selection lines are at the logic 1 state, and the special operation mode is selected when at least one mode-selection line is at the logic 0 state. Also other combinations of mode-selection lines are possible for carrying out the selection of two operation mode.

The present invention is not restricted solely to the embodiments presented above, but it can be modified within the scope of the accompanying claims. E.g. the electronic device 2 used can be other than those introduced above. The reference numerals of the contact pins and other elements referred in the accompanying claims are mentioned only as clarifying examples, but the invention is not restricted solely thereto.

One advantageous embodiment of the expansion card 1 comprises at least a power amplifier of a mobile station, such as a GSM mobile station.

What is claimed is:

1. An expansion card comprising at least one expansion-card connector for connecting the expansion card to a second expansion-card connector of an electronic device, said expansion card having at least a standard normal operation mode and one or several special operation modes that differ from the standard normal operation mode, and the operation mode of said expansion card being arranged to be selected by at least one mode-selection line, wherein:

the mode-selection line is combined to a contact pin of the one expansion-card connector which contact pin has a respective contact pin for the second expansion-card connector of the electronic device, said respective contact pin being defined as the input line of the electronic device in said standard normal operation mode, and the mode selection line is arranged to be used, if necessary, for the original purpose after the mode selection.

2. An expansion card as set forth in claim 1, wherein the standard normal operation mode is the PCMCIA standard.

3. An expansion card as set forth in claim 1, wherein said one mode-selection line is connected to at least one of a control line for a loudspeaker, an interruption-request line, a width-selection line of an I/O port, an operation line for wait states, and a state-change line for the expansion card, said lines belonging to an expansion-card connector.

4. An expansion-card interface for an electronic device, said expansion-card interface comprising at least one expansion-card connector for connecting an expansion card to the electronic device, said expansion card having at least a standard normal operation mode and one or several special operation modes which differ, at least partially, from said standard normal operation mode, and the operation mode of said expansion card is arranged to be selected at least by one mode-selection line, wherein:

a contact pin of the expansion-card interface is arranged as the mode-selection line, which in said standard normal operation mode is defined as the input line of the electronic device, and the mode selection line is arranged to be used, if necessary, for the original purpose after the mode selection.

5. An expansion-card interface as set forth in claim 4, wherein the standard normal operation mode is the PCMCIA standard.

6. An expansion-card interface as set forth in claim 4, wherein said expansion-card interface comprises a control line for a loudspeaker and said one mode-selection line is connected to the control line for a loudspeaker of the expansion-card interface.

7. An expansion card interface as set forth in claim 4, characterized in that said one mode-selection line is connected to at least one of a control line for a loudspeaker, an interruption-request line, a width-selection line of an I/O port, an operation line for wait states, and a state-change line for the expansion card, said lines belonging to said expansion-card connector.

8. An electronic device comprising at least one expansion-card interface for connecting an expansion card to said electronic device, said expansion card having at least a standard normal operation mode and one or several special operation modes which differ at least partially from said standard normal operation mode, and the operation mode of said expansion card being arranged to be selected by at least one mode-selection line, wherein:

a contact pin of the expansion-card interface is arranged as the mode-selection line, which in said standard normal operation mode is defined as the input line of the electronic device, and the mode selection line is arranged to be used, if necessary, for the original purpose after the mode selection.

9. An electronic device as set forth in claim 8, comprising an expansion-card interface according to the PCMCIA standard.

10. An electronic device as set forth in claim 8, comprising means for setting the mode-selection line of the expansion card to a state corresponding to the standard normal operation mode.

11. An electronic device as set forth in claim 8, comprising means for setting the mode-selection line of the expansion card to correspond to the state of the special operation mode.

12. An electronic device as set forth in claim 10, wherein the state corresponding to the standard normal operation mode of the mode-selection line is the logic 1 state and the state corresponding to the special operation mode of the mode-selection line is the logic 0 state.

13. An electronic device as set forth in claim 7, characterized in that said one mode-selection line is connected to at least one of a control line for a loudspeaker, an interruption-request line, a width-selection line of an I/O port, an operation line for wait states, and a state-change line for the expansion card, said lines belonging to said expansion-card interface.

* * * * *